(12) United States Patent
Brenot et al.

(10) Patent No.: US 9,537,597 B2
(45) Date of Patent: Jan. 3, 2017

(54) TELECOMMUNICATIONS NETWORK NODE LINKING A METROPOLITAN AREA NETWORK WITH AT LEAST ONE ACCESS NETWORK

(71) Applicant: ALCATEL LUCENT, Paris (FR)

(72) Inventors: Romain Brenot, Palaiseau (FR); Guilhem De Valicourt, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/654,935

(22) PCT Filed: Dec. 27, 2013

(86) PCT No.: PCT/EP2013/078079
§ 371 (c)(1),
(2) Date: Jun. 23, 2015

(87) PCT Pub. No.: WO2014/102346
PCT Pub. Date: Jul. 3, 2014

(65) Prior Publication Data
US 2015/0381302 A1 Dec. 31, 2015

(30) Foreign Application Priority Data
Dec. 28, 2012 (EP) .................................... 12306695

(51) Int. Cl.
*H04J 14/02* (2006.01)
*H04Q 11/00* (2006.01)

(52) U.S. Cl.
CPC ........ *H04J 14/0201* (2013.01); *H04J 14/0204* (2013.01); *H04J 14/0205* (2013.01);
(Continued)

(58) Field of Classification Search
CPC .... H04J 14/02; H04J 14/0201; H04J 14/0202; H04J 14/021; H04J 14/0205; H04J 14/0212
(Continued)

(56) References Cited

U.S. PATENT DOCUMENTS 6,266,460 B1 * 7/2001 Doerr ................. G02B 6/12019
385/16
6,744,986 B1 * 6/2004 Vohra .................. H04J 14/0205
398/49
(Continued)

FOREIGN PATENT DOCUMENTS

| EP | 2538592 A1 | 12/2012 |
|---|---|---|
| JP | H11174389 A | 7/1999 |
| JP | 2004350279 A | 12/2004 |

OTHER PUBLICATIONS

G. De Valcourt et al., "Reflective packet add-drop multiplexer based on modulation format agnostic and low-cost optical gate," ECOC Technical Digest, 2012, pp. 1-3.
(Continued)

*Primary Examiner* — Hanh Phan
(74) *Attorney, Agent, or Firm* — Harness, Dickey & Pierce, P.L.C.

(57) ABSTRACT

The telecommunications network node linking a metropolitan area network, including at least one optical link connecting the nodes, with at least one access network, includes an electronic card that enables the aggregation of traffic from multiple access networks, a transmitter capable of receiving an electrical signal from the electronic card and of transmitting an optical packet to the metropolitan area network, a circulator capable of extracting a stream of multiplexed optical packets from the optical link and of inserting a stream of multiplexed optical packets into the optical link, and a reflective switching matrix receiving a stream of
(Continued)

Figure 1:
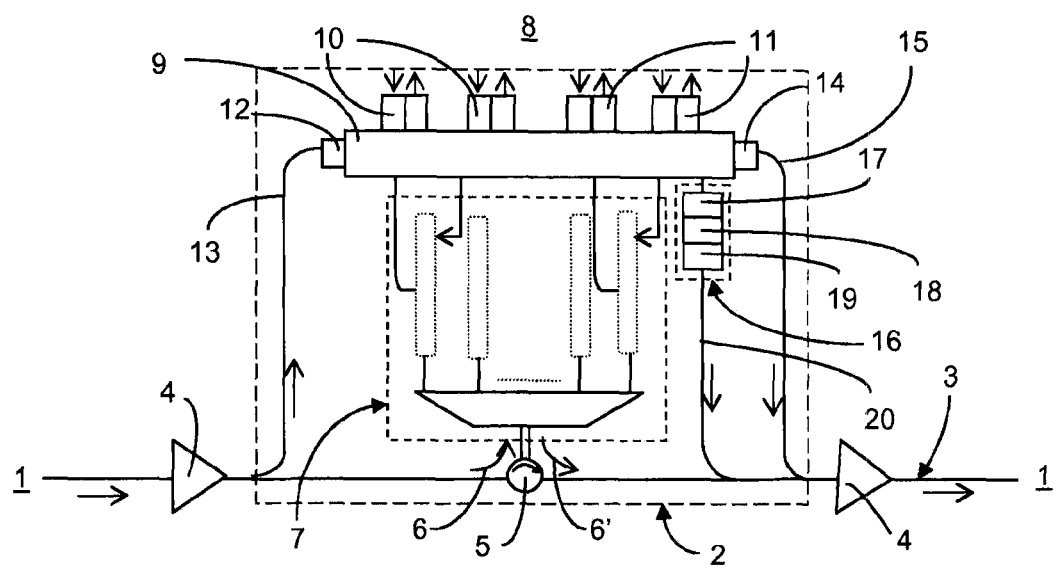

multiplexed optical packets from among which it selects and detects those intended for the access network. The reflective switching matrix includes a POADM optical packet add/drop multiplexer that receives multiplexed optical packets and transmits demultiplexed optical packets, and at least one RSOA reflective semiconductor optical amplifier capable of receiving a demultiplexed optical packet, which includes three sections.

11 Claims, 1 Drawing Sheet

(52) U.S. Cl.
CPC ...... *H04J 14/0206* (2013.01); *H04J 14/0212* (2013.01); *H04J 14/0275* (2013.01); *H04Q 2011/0013* (2013.01); *H04Q 2011/0016* (2013.01); *H04Q 2011/0035* (2013.01); *H04Q 2011/0047* (2013.01)

(58) Field of Classification Search
USPC ...... 398/83, 79, 45, 48, 49, 82, 884, 85, 59, 398/84, 87; 385/24, 37, 16, 17, 18
See application file for complete search history.

(56) References Cited

U.S. PATENT DOCUMENTS

2006/0210273 A1* 9/2006 Gumaste ............ H04J 14/0204
398/83

2007/0172240 A1* 7/2007 Terai ...................... H04J 14/02
398/83
2009/0074418 A1* 3/2009 Levy .................. H04J 14/0227
398/83

OTHER PUBLICATIONS

A. Garreau, "10 Gbit/s Drop and Continue Colorless Operation of a 1.5 m AlGaInAs Reflective Amplified Electroabsorption Modulator", Proceedings I ECOC 2006, 32nd European Conference on Optical Communication : Sep. 24-28 2006, Cannes, France, SEE, Paris. France, Sep. 24, 2006 (Sep. 24, 2006), pp. 1-2.
D. Chiaroni, "New generation metro networks: Challenges and opportunities". 36th European Conference and Exhibition on Optical Communication : (ECOC 2010) ; Torino, Italy, Sep. 19-23, 2010, IEEE. Piscataway, NJ, USA, Sep. 19, 2010 (Sep. 19, 2010), pp. 1-12.
Y. Pointurier, Dimensioning and Energy Efficiency of Multi-Rate Metro Rings . . . Journal of Lightwave Technology, IEEE Service Center, New York, NY, US, vol. 30, No. 22, Nov. 15, 2012 (Nov. 15, 2012), pp. 3552-3564.
M. Liu, "Numerical modeling and experimental testing of reflective semiconductor optical amplifier (RSOA) with modulation bandwidth optimization", Communications and Photonics Conference and Exhibition (ACP), 2010 Asia, IEEE, Piscataway, NJ, USA, Dec. 8, 2010.
International Search Report PCT/ISA/210 for International Application No. PCT/EP2013/078079 dated Apr. 2, 2014.
"Optical Packet Ring Network Offering Bit Rate and Modulation Formats Transparency," Chiaroni et al., OFC/NFOEC 2010, Mar. 2010.

* cited by examiner

TELECOMMUNICATIONS NETWORK NODE LINKING A METROPOLITAN AREA NETWORK WITH AT LEAST ONE ACCESS NETWORK

The present invention pertains to the field of metropolitan telecommunications networks, and in particular Wavelength Division Multiplexing (WDM) optical fiber telecommunications networks.

Metropolitan area networks are subject to particular requirements such as flexibility, the ability to self-configure, and the need to be able to introduce new services on demand. The evolution of new Internet services is likely to create sporadic, distributed traffic within a metropolitan area network, or MAN. On-demand bandwidth requires greater flexibility, because content distribution networks target the metropolitan segment. The advantage of optical packet technology is that it enables high efficiency owing to sub-wavelength granularity.

A WDM wavelength division multiplexing ring-shaped telecommunication network that comprises telecommunications nodes based on an optical packet add/drop multiplexer or POADM is capable of inserting, extracting, or transferring optical packets transported on wavelength channels, and particularly optical packets transported over multiple channels. This is a promising candidate for the future evolution of optical packet switched networks. Electronic processing is used to aggregate traffic coming from line cards of the access network. Optical transparency reduces electronic processing, because optical packets can travel directly to another POADM telecommunications node, enabling energy savings compared to ring-shaped telecommunications networks with opaque nodes.

Different approaches have been proposed, focusing on a fixed receiver with an in-line fast optical packet selector, or FOPS. In one solution, the additional traffic may be inserted at any wavelength. In another solution, a fixed laser is used with a FOPS fast optical packet selector placed before the receiver of the POADM node. However, it is necessary to find a compromise between cost, particularly owing to the number of FOPS fast optical packet selectors, and the efficiency of the optical telecommunications network.

As previously mentioned, the cost of a FOPS fast optical packet selector is crucial in a realistic proposal to deploy such an optical telecommunications network that comprises nodes based on a POADM multiplexer. A solution has been proposed in which a semiconductor optical amplifier, or SOA, is used as a logic gate in order to erase or amplify optical packets. However, the use of the solution in a real system runs up against the high cost of the devices, particularly SOA optical amplifiers.

Various other solutions have also been proposed as FOPS fast optical packet selectors integrated onto an InP or silicon platform by different technologies (SOA, VOA, MZM for "March-Zender Modulator"), such as, for example, a photonic FOPS fast optical packet selector integrated onto silicon, based on a variable optical attenuator or VOA. However, the solutions are only being considered for the long-term evolution of these products, and remain very expensive.

Recently, a packet-reflective optical switch or PROS has been proposed. The structure uses a reflective semiconductor optical amplifier or RSOA. These RSOA optical amplifiers, designed for access networks, are low-cost devices that make it possible to considerably reduce the cost of the POADM node, and are available off the shelf. A PROS reflective fast optical packet selector must be placed on the optical connection or before the receiver of the POADM node, in order to increase the efficiency and flexibility of the network. However, the compromise to be struck between the cost of the devices and the performance of the network leads to a less efficient architecture.

Until recently, efforts have primarily focused on reducing the cost of a fast optical packet selector, or FOPS. However, the cost, related to the number of FOPS fast optical packet selectors needed, remains a problem. This invention proposes a solution in which the architecture of the optical telecommunications network comprises a lesser number of devices needed for fast optical packet selection.

The subject matter of the present invention is a telecommunications network node that links a metropolitan area network, comprising at least one optical link connecting the nodes, with at least one access network, comprising
- an electronic card that makes it possible to aggregate traffic coming from multiple access networks,
- a transmitter capable of receiving an electronic signal from the electronic card and of transmitting an optical packet to the metropolitan area network,
- a circulator capable of extracting a stream of multiplexed optical packets from the optical link and of inserting a stream of multiplexed optical packets into the optical link, and
- a reflective switching matrix that receives a stream of multiplexed optical packets sent by the circulator from among which it selects the optical packets and detects those intended to be sent to the access network.

According to one embodiment, the reflective switching matrix comprises
- an optical packet add-drop multiplexer POADM that receives multiplexed optical packets and transmits demultiplexed optical packets, and
- at least one reflective semiconductor optical amplifier RSOA capable of receiving a demultiplexed optical packet, which comprises three sections each having a distinct function.

According to another embodiment, the reflective semiconductor optical amplifier RSOA comprises
- a first section which is an optical amplifier for amplifying the demultiplexed optical packet,
- a second section which is a detector that receives the amplified demultiplexed optical packet, and detects the amplified demultiplexed optical packets intended to be directly transmitted to the electronic card according to the received instructions, and
- a third section that is a logic gate for extracting or transmitting by reflection the amplified demultiplexed optical packets.

The proposed technical solution is a reflective switching matrix called a fast optical packet selector/detector or PROS/D, which is unique, and enables the selection of optical packets for the transit data stream as well as simultaneous detection. It is formed by a multi-section optical amplifier RSOA in order to fulfill the separate functions simultaneously. The PROS/D multi-section RSOA switching matrix built onto a single chip reduces the number of FOPS needed while preserving high network performance. This PROS/D switching matrix enables the detection, selection, and distribution/selection functions whenever a single packet is being sent to multiple different nodes, e.g. for multicasting.

According to one embodiment, the detector identifies the amplified demultiplexed optical packet, refers to the received instructions, and sends the amplified demultiplexed optical packet to the electronic card of the access network.

According to another embodiment, the detector identifies the amplified demultiplexed optical packet, refers to the received instructions, and sends the amplified demultiplexed optical packet to the third section.

In the latter case, in one variant, the logic gate of the third section identifies the amplified demultiplexed optical packet, refers to the received instructions, and extracts the optical packet. According to another variant, the logic gate in the third section identifies the amplified demultiplexed optical packet, refers to the received instructions, and the mirror returns the optical packet to the multiplexer.

In yet another embodiment, the transmitter comprises
a tunable or selectable laser capable of converting the electrical signal received from the electronic card into a constant optical signal,
a modulator capable of modulating the constant optical signal received from the laser, inserting data, and converting it into optical packets, and
an amplifier serving as an optical gate for the optical packet received from the modulator.

According to a first aspect, the metropolitan area network node further comprises at least one couple are capable of inserting an optical packet from the transmitter into the optical link.

According to a second aspect, the metropolitan area network node further comprises at least one control channel connecting the optical link to the electronic card capable of transmitting instructions from and to the reflective switching matrix.

According to a third aspect, the metropolitan area network node further comprises at least one coupler capable of extracting from the optical link an optical packet of the control channel.

According to a fourth aspect, the metropolitan area network node further comprises at least one coupler capable of inserting into the optical link an optical packet of the control channel.

A WDM packet-switched telecommunications network will soon be deployed. An efficient, inexpensive POADM optical packet add/drop multiplexer telecommunications node is one of the key elements that makes up such network, and its compatibility with the existing network is mandatory. The PROS/D fast selector/detector makes it possible to reduce the cost of a FOPS optical packet selector, as well as the number of those selectors (a single PROS/D in a node architecture compared to two FOPS).

Figure 2:
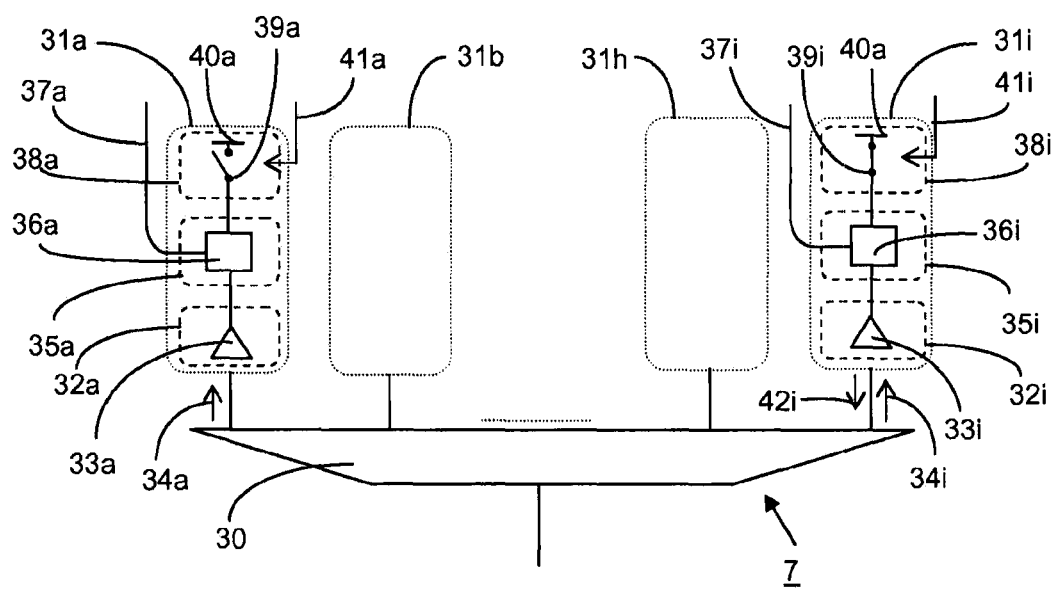

Other characteristics and advantages of the present invention will become apparent upon reading the following description of one embodiment, which is naturally given by way of a non-limiting example, and in the attached drawing, in which:

FIG. 1 depicts the architecture of a POADM optical packet add/drop multiplexer telecommunications node belonging to a ring-shaped telecommunications metropolitan area network, FIG. 2 depicts in greater detail the PROS/D reflective switch matrix of the POADM optical packet add/drop multiplexer telecommunications node.

In the embodiment depicted in FIG. 1, a portion of a ring-shaped telecommunications metropolitan area network 1 comprises a telecommunications node 2 based on a POADM optical packet add/drop multiplexer, and an optical link 3 such as an optical fiber, transporting a multiplexed optical signal, connecting the POADM telecommunication nodes to one another, with EDFA erbium-doped fiber amplifiers 4 additionally being potentially disposed between the POADM telecommunications nodes. A circulator 5 directs the stream of multiplexed optical packets circulating within the optical link 3 in the direction indicated by the arrow 6 towards the switching matrix 7 of the POADM telecommunications node 2 which will be described in greater detail below.

The POADM telecommunications node 2 makes it possible to establish the connection with a user access network 8 owing to an electronic card 9 that makes it possible to convert the optical packet into an electrical signal. The electrical signals are received from the access network 8 by RX reception ports 10 and transmitted to the access network 8 by transmission ports TX 11. Additionally, a RX reception port 12 receives instructions needed for the POADM telecommunications node to operate 2 in the form of an optical packet that is transported on a dedicated wavelength of a control channel 13. The control channel 13 is connected to the ring-shaped network 1 at the input of the POADM telecommunications node 2 is detected by a coupler whose role is to extract the control channel 13 from the stream of multiplexed optical packets circulating within the optical link 3. A transmission port TX 14 sends back information on the operation of the POADM telecommunications node 2 in the form of an optical packet by a control channel 15. The control channel 15 is connected to the ring-shaped metropolitan area network 1 by a coupler whose function is to insert the control channel 15 into the stream of multiplexed optical packets in the optical link 3. A control channel 13, 15 on a dedicated wavelength is particularly used to learn the destination of each optical packet, and to transmit the needed information to the POADM telecommunication node 2 so that it can carry out the various operations provided (extraction, addition, detection, transmission, etc.) so that the optical packet can reach its destination.

The electrical signals from the access network 8, via the reception ports RX 10 and the electronic card 9, are processed and transmitted to the optical layer of the telecommunications node 2 by a transmitter 16. The transmitter 16 comprises a tunable or selectable fast laser 17 that emits an unmodulated constant optical signal. The constant optical signal is sent to a modulator 18. The optical signal is then modulated and transformed into an optical packet by the addition of data. An optical amplifier 19 placed after the modulator 18 makes it possible to erase or amplify the various optical packets. The selectable laser may be a photonic integrated circuit, or PIC, which comprises multiple fixed lasers integrated onto a single chip. In the transmitter 16, the tunable or selectable fast laser 17 is used to generate various wavelengths, the modulator 18 is used to print a modulation onto the optical packet, and the SOA optical amplifier 19 is used as an optical gate to block (or amplify) the optical packet. For example, the tunable or selectable fast laser 17 is tuned to a new wavelength, the SOA optical amplifier 19 is set to the "off" position during that operation, thereby blocking any unwanted optical packets (interferometric noise). Next, the SOA optical amplifier 19 is set back to the "on" position when a new optical packet is sent to that new wavelength by the optical channel 20 that connects the tunable or selectable fast laser 17 to the ring-shaped network 1. The optical packet from the transmitter 16 is inserted into the traffic of the ring-shaped telecommunications network 1, for example by means of a coupler. A function of the couplers to insert the optical packet received from the transmitter 16 via the channel 20 into the stream of multiplexed optical packets circulating within the optical link 3.

We shall now consider FIG. 2, which depicts in greater detail the reflective switching matrix 7 known as the PROS/D or fast optical packet selector/detector, of the telecommunication node POADM 2. Upon leaving the circulator 5, the stream of optical packets enters an optical packet add/drop multiplexer 30 that separates the optical packets based on their wavelengths, and assigns each optical packet to a RSOA amplifier, 31a, 31b, . . . , 31h, 31i respectively. The RSOA reflective optical amplifier 31a for example, comprises three sections that each provides a different function (amplification, detection, and transmission/deletion).

At the input, the first section 32a, which is always positively polarized, is used as an optical amplifier 33a whose function is to amplify the incoming demultiplexed optical packet 34a.

The second section 35a, which is negatively polarized, is used as a receiver 36a whose function, in accordance with the received instructions, is to detect and select the amplified incoming demultiplexed optical packet 34a. The detected optical signal is converted into an electrical signal sent by the connection 37a to the access network 8 via the electronic card 9. The receiver 36a may also receive an instruction to allow the amplified incoming optical packet 34a to continue to the third section without selecting it. The length of the second section 35a is determined as a compromise between detection bandwidth and sensitively, in order to obtain detection bandwidth of 40 GHz and above.

The third section 38a of the RSOA reflective semiconductor optical amplifier 31a is a logic gate 39a followed by a mirror 40a. The logic gate 39a receives, via the connection 41a, the instructions in the form of electrical signals provided by the control channel 13. The third section 38a is either positively polarized to transmit the incoming optical packet, or grounded, or negatively polarized to increase absorption into that area, in order to erase the optical packet. The latter case is the one depicted here.

Likewise, the RSOA optical amplifier 31i also comprises three sections similar to the ones previously described. The first section 32i, which is always positively polarized, is an optical amplifier 33i whose function is to amplify the incoming optical packet 34i.

The second section 35i is a receiver 36i whose function is to detect the incoming optical packet 34i once amplified in the first section 32i. According to the received instructions, the receiver 36i sends the detected optical signal is converted into an electrical signal by the connection 37i to the access network 8.

The third section 38i of the RSOA reflective semiconductor optical amplifier 31i is a logic gate 39i followed by a mirror 40i. The logic gate 39i receives, via the connection 41i, the instructions in the form of electrical signals provided by the control channel 13. The third section 38i here is positively polarized to transmit the optical packet. When transmitting the optical packet, that packet is reflected by the mirror 40i and is sent backwards in the form of an outgoing optical packet 42i to the multiplexer 30. The optical amplifier 33i function of the first section 32i in this case is to stimulate the outgoing optical packet 42i.

It should be noted that to obtain a logic gate 39a capable of efficiently blocking the optical packet, the length of that section serving as a switch must be as long as possible. In the prior art, whenever that section is meant to additionally provide the function of a fast photodiode that requires the shortest possible length, it becomes necessary to compromise on the length of the section, and the performance of the logic and function is thereby degraded.

Naturally, the present invention is not limited to the described embodiments, but is, rather, subject to many variants accessible to the person skilled in the art without departing from the spirit of the invention. In particular, it is possible, without departing from the scope of the invention, to modify the number of RSOA reflective semiconductor optical amplifiers of the PROS/D fast optical packet selector/detector reflective switching matrix of a metropolitan area network in connection with at least one access network in a telecommunications network.

The invention claimed is:

1. A telecommunications network node configured to link a metropolitan area network that includes at least one optical link connecting nodes of the metropolitan area network with at least one access network, the telecommunications network node comprising:
   an electronic card configured to aggregate traffic coming from multiple access networks,
   a transmitter configured to receive an electronic signal from the electronic card and transmit an optical packet to the metropolitan area network,
   a circulator configured to extract a first stream of multiplexed optical packets from the optical link and insert a second stream of multiplexed optical packets into the optical link, and
   a reflective switching matrix configured to,
      demultiplex the received first stream of multiplexed optical packets from the circulator, and
      send selected ones of the demultiplexed optical packets to the access network, the selected ones of the demultiplexed optical packet intended to be sent to the access network, the reflective switching matrix including at least one Reflective Semiconductor Optical Amplifier (RSOA) configured to receive the demultiplexed optical packets, the RSOA having three sections each having a distinct function, the third section being a logic gate.

2. The telecommunications network node according to claim 1, wherein the reflective switching matrix further comprises:
   an optical packet add-drop multiplexer (POADM) configured to receive the first stream of multiplexed optical packets and transmits the demultiplexed optical packets to the RSOA.

3. The telecommunications network node according to claim 1, wherein
   a first section of the three sections is an optical amplifier configured to amplify the demultiplexed optical packets,
   a second section of the three sections is a detector configured to,
      receive the amplified optical packet from the optical amplifier, and
      detect at least one first optical packet from among the amplified optical packets intended to be directly transmitted to the electronic card according to instructions received at the RSOA, and
   the logic gate is configured to at least one of extract and transmit by reflection at least one second optical data packet from among the amplified optical packets not intended to be directly transmitted to the electronic card.

4. The telecommunications network node according to claim 3, wherein the detector is configured to transmit the at least one first optical packet to the electronic card.

5. The telecommunications network node according to claim 3, wherein the logic gate is configured to at least one of extract and transmit by reflection the at least one second optical packet based on received instructions.

6. The telecommunications network node according claim 3, further comprising:
  a mirror, wherein the logic gate is configured to utilize the mirror for transmitting the at least one second optical packet by reflection, the at least one second optical packet being part of the second stream of multiplexed optical links.

7. The telecommunications network node according to claim 1, wherein the transmitter comprises:
  a tunable or selectable laser configured to convert the electrical signal received from the electronic card into a constant optical signal,
  a modulator configured to modulate the constant optical signal received from the laser, insert data, and convert the constant optical signal with the inserted data into the optical packet, and
  an amplifier configured to serve as an optical gate for the optical packet received from the modulator.

8. The telecommunications network node according to claim 1, further comprising
  at least one coupler configured to insert into the optical link the optical packet received from the transmitter.

9. The telecommunications network node according to claim 1, further comprising:
  at least one control channel between the optical link to the electronic card for transmission of instructions from and to the reflective switching matrix.

10. The telecommunications network node according to claim 9, further comprising:
  at least one coupler configured to extract from the optical link the first stream of multiplexed optical packets to be transmitted to the electronic card.

11. The telecommunications network node according to claim 9, further comprising: at least one coupler configured to insert into the optical link an optical packet the second stream of multiplexed optical links received from the electronic card and the optical packet received from the transmitter.

* * * * *